United States Patent
Getsch

(10) Patent No.: US 8,498,477 B2
(45) Date of Patent: Jul. 30, 2013

(54) BULK IMAGE GATHERING SYSTEM AND METHOD

(75) Inventor: Timothy E. Getsch, Redmond, WA (US)

(73) Assignee: Timothy Getsch, Redmond, WA (US)

( * ) Notice: Subject to any disclaimer, the term of this patent is extended or adjusted under 35 U.S.C. 154(b) by 301 days.

(21) Appl. No.: 13/084,463

(22) Filed: Apr. 11, 2011

(65) Prior Publication Data

US 2011/0188746 A1 Aug. 4, 2011

Related U.S. Application Data

(63) Continuation-in-part of application No. 11/669,772, filed on Jan. 31, 2007, now Pat. No. 7,924,314.

(60) Provisional application No. 60/766,610, filed on Jan. 31, 2006.

(51) Int. Cl.
 *G06K 9/34* (2006.01)
 *G06K 9/00* (2006.01)
 *G06K 9/62* (2006.01)

(52) U.S. Cl.
 USPC ........... 382/171; 382/168; 382/170; 382/209; 382/216; 348/207.1; 348/222.1; 348/333.01; 348/333.05

(58) Field of Classification Search
 USPC ...... 348/207.99–207.2, 222.1, 231.99–231.9, 348/333.01–333.13; 382/162–172, 181, 382/190–228, 254, 260–275
 See application file for complete search history.

(56) References Cited

U.S. PATENT DOCUMENTS

| | | | |
|---|---|---|---|
| 6,538,698 B1 * | 3/2003 | Anderson | 348/333.05 |
| 7,929,037 B2 * | 4/2011 | Chosa | 348/333.01 |
| 8,213,029 B2 * | 7/2012 | Tsue et al. | 358/1.13 |
| 8,411,968 B2 * | 4/2013 | Isomura et al. | 382/224 |
| 2002/0067856 A1 * | 6/2002 | Fujii et al. | 382/218 |
| 2002/0099565 A1 * | 7/2002 | Kito | 705/1 |
| 2004/0008906 A1 * | 1/2004 | Webb | 382/306 |
| 2004/0131336 A1 * | 7/2004 | Matsuno et al. | 386/95 |
| 2005/0007468 A1 * | 1/2005 | Stavely et al. | 348/239 |
| 2005/0104976 A1 * | 5/2005 | Currans | 348/231.5 |
| 2005/0168779 A1 * | 8/2005 | Tsue et al. | 358/1.18 |
| 2005/0219665 A1 * | 10/2005 | Mino | 358/537 |
| 2005/0220341 A1 * | 10/2005 | Akahori | 382/170 |
| 2007/0216950 A1 * | 9/2007 | Yamakado et al. | 358/1.18 |
| 2009/0022401 A1 * | 1/2009 | Huang | 382/190 |
| 2011/0243453 A1 * | 10/2011 | Kashima et al. | 382/195 |
| 2012/0155764 A1 * | 6/2012 | Ogura | 382/171 |
| 2012/0328189 A1 * | 12/2012 | Usher | 382/165 |

OTHER PUBLICATIONS

Zhang Z et al., "An improving technique of color histogram in segmention-based image retrieval," 5th International Conference of Information Assurance and Security; 2009 IEEE pp. 381-384.

Park J, "Image indexing using spatial multi-resolution color histogram," Department of Information Communication, Chosun University Kwangju, South Korea; Jan. 29, 2008.

Park, D-S et al., "Image indexing using weighted color histogram," Proceedings of the International Conference on Image Analysis, Sep. 27-29, 1999; pp. 909-914.

* cited by examiner

*Primary Examiner* — Michael Osinski

(74) *Attorney, Agent, or Firm* — Æ ON Law; Adam L. K. Philipp

(57) ABSTRACT

A system and method for gathering bulk images are provided herein.

15 Claims, 11 Drawing Sheets

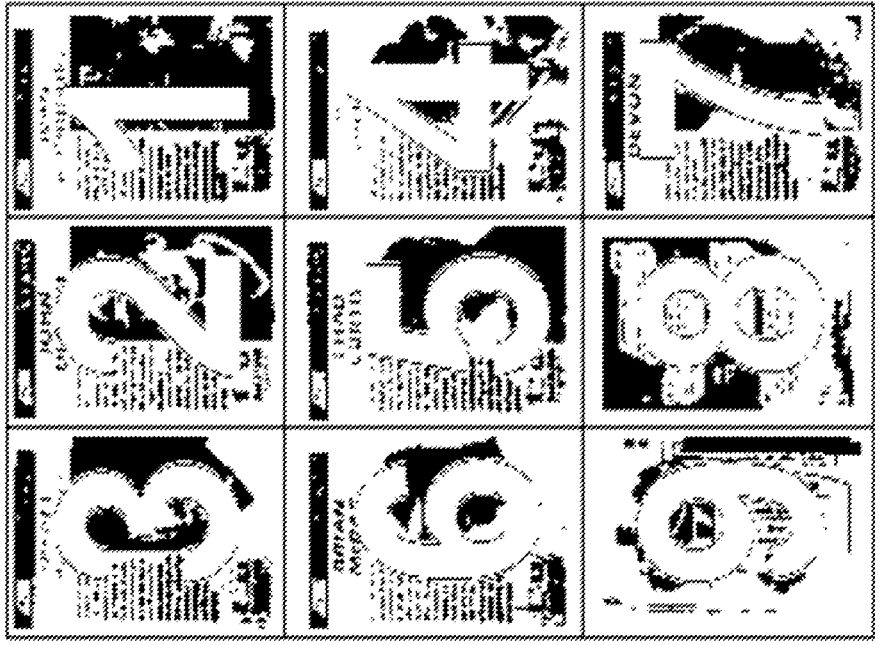
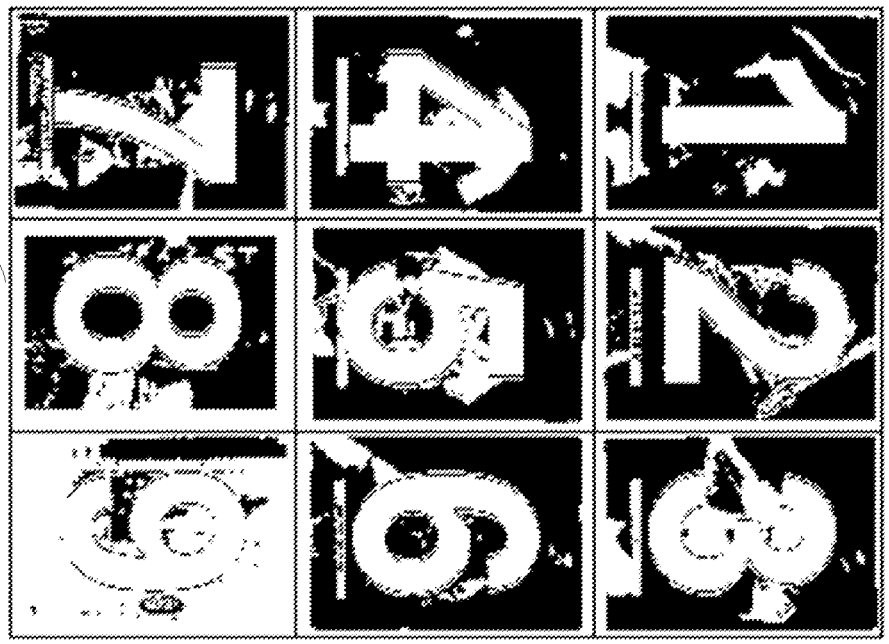
Fig. 2.

BULK IMAGE GATHERING SYSTEM AND METHOD

CROSS-REFERENCE TO RELATED APPLICATIONS

This application is a continuation in part of U.S. Non-Provisional patent application Ser. No. 11/669,772, titled "BULK IMAGE GATHERING SYSTEM AND METHOD," filed Jan. 31, 2007, and naming inventor Timothy Getsch. U.S. Non-Provisional patent application Ser. No. 11/669,772 claims the benefit of priority to U.S. Provisional Patent Application No. 60/766,610, titled "BULK IMAGE GATHERING SYSTEM AND METHOD," filed on Jan. 31, 2006, and naming inventor Timothy Getsch. The above-cited applications are hereby incorporated by reference in their entireties, for all purposes.

FIELD

The present disclosure relates to the field of data capture. In particular, this disclosure relates to methods and systems for digitally capturing holder objects for use in storing, retrieving, cataloging, and identifying bulk captured images.

BACKGROUND

Sports cards, stamps, coins, photographs, photo slides, postcards, stickers, magazines, comic books, comic cards, playing cards, trading cards, gaming cards, "pogs," or the like lend themselves well to gathering images in bulk. These items may be stored individually without protection or with protective sheets, cases, holders or the like. It is also common to store such items in pages, books, or the like. Storing them in groups of multiple items may improve the ability to gather images in bulk. Some examples of common ways that items may be stored are: sports cards may be stored in 9 pocket pages, 12 pocket pages, 15 pocket pages, 4 pocket pages, 6 pocket pages, 8 pocket pages, or the like; coins may be stored in 12 pocket pages, 20 pocket pages, coin books, or the like; books and comic books may be stored in pocket sleeves or the like.

There are many technologies for getting digital images (e.g., scanner, digital camera, video camera, web camera, etc.). These technologies produce sets of images. These technologies may be used to capture digital images of items such as sports cards, stamps, coins, photographs, and the like. In many cases, these digital image-capturing technologies are capable of capturing multiple items in a single image. However, it is often desirable to split the captured digital image into separate sub-images; often one of each individual item. To accomplish this task, some tools such as digital image manipulation software may be used to split each individual image out of the larger image.

Once images are split, the images may be given meaningful names, and it is common to associate additional data with each of the individual images. To make matters more complicated, it is often desirable to capture the backsides of the items captured in the image as well, and to maintain the association between the front and the back of each individual item that is in the set of items. Altogether, this process is tedious, time consuming, and error prone.

BRIEF DESCRIPTION OF THE DRAWINGS

FIG. 2 is an example of a front and back image capture of a 9-pocket page of sports cards, in accordance with one embodiment.

DETAILED DESCRIPTION

Figure 1:
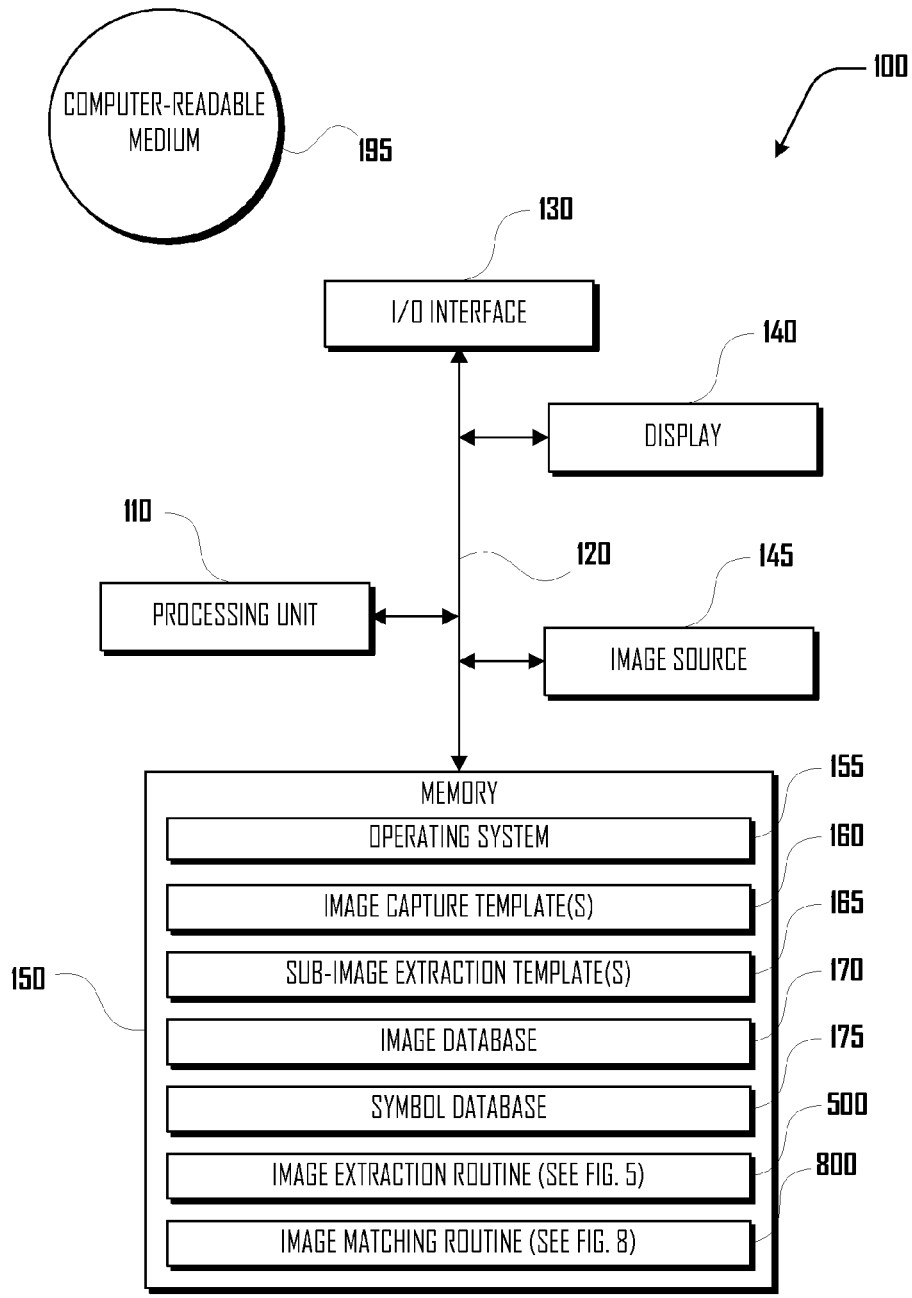
FIG. 1 is a representation of an example user device suitable for use in various embodiments.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. Those of ordinary skill in the art will appreciate that other embodiments, including additional devices, or combinations of illustrated devices, may be added to, or combined, without limiting the scope to the embodiments disclosed herein.

In one exemplary embodiment of gathering images in bulk, a system (including a computer, one or more scanners and a related software application) was developed. See FIGS. 3-4 for example screenshots of one example implementation of such a software application. Other digital image capturing devices or computing devices could be used in other examples of this technology.

FIG. 1 illustrates several of the key components of the user device 100. In some embodiments, the user device 100 may include many more components than those shown in FIG. 1. However, it is not necessary that all of these generally conventional components be shown in order to disclose an illustrative embodiment. As shown in FIG. 1, the user device 100 includes an I/O interface 130 for connecting to other devices in the digital content registry system 100. In various embodiments, the I/O interface 130 includes the necessary circuitry for such a connection and is constructed for use with the appropriate protocol.

The user device 100 also includes a processing unit 110, a memory 150 and may include a display 140, an image source 145, all interconnected along with the I/O interface 130 via a bus 120. The memory 150 generally comprises a random access memory ("RAM"), a read only memory ("ROM"), and a permanent mass storage device, such as a disk drive. The memory 150 stores the program code necessary for image capture template(s) 160, sub-image extraction template(s) 165, image database 170, symbol database 175 and image extraction routine 500. In addition, the memory 150 also stores an operating system 155.

These and other software components may be loaded from a computer readable storage medium 195, on which instructions for performing the software components are tangibly embodied, into memory 150 of the user device 100 using a drive mechanism (not shown) associated with the non-transient, tangible, computer readable storage medium 195, such as a floppy disc, tape, DVD/CD-ROM drive, memory card. In some embodiments, software components may also be loaded via the I/O interface 130 or other non-storage media.

Although an exemplary user device 100 has been described that generally conforms to conventional general purpose computing devices, those of ordinary skill in the art will appreciate that a user device 100 may be any of a great number of devices, such as a personal data assistant ("PDA"), scanner, camera, cellular phone or the like.

In various embodiments, the user can start gathering images based on a template sequence, the user can create a new template by training the software how to split up images and how to name them, or the user can create a template sequence by telling the software what set of templates should be used as a sequence.

In one exemplary embodiment, instructions are received to start gathering images. The system allows the user to insert sheets, pages, cases or other holder objects in a scanner (e.g., image capture device 145 or the like). Next, the system captures an image, splits the image into sub-images based on a sub-image extraction template 165 in a possible sequence of templates and names each of the sub-images (or otherwise associates identifying metadata with each sub-image). If the sub-image extraction template sequence defines a template for the back of the sheet or page, the user may then flip (either from side-to-side or from top-to-bottom, depending on the template, or automatically recognized by the system) the sheet or page, and the system captures another image. That image is split into sub-images based on the next sub-image extraction template in the sequence, and the images are named (or otherwise labeled) according to the information from that template. This process is described in further detail below with regard to FIGS. 5-7.

The naming/labeling conventions defined in the templates can generate an association between a front sub-image and a back sub-image (in the case of coins, collectable cards and other objects with two information-bearing sides), or they can keep the images unassociated (e.g., photographs or other single-sided objects). This process can then be repeated with additional sheets or pages. In some embodiments, the metadata (name, label or other information) includes specific information about the position of an object. In other embodiments, the metadata uses the position as at least part of the identifying information (e.g., the second card of the first row of the tenth sheet of objects).

See FIG. 2 for an example of what happens when scanning the front and back of a 9-pocket page of sports cards. The top side 205 of the 9-pocket page displays a first side of each card held in a pocket (labeled 1-9). The bottom side 210 of the 9-pocket page displays a corresponding second side, when flipped vertically, of each card held in a pocket (with corresponding sides also labeled 1-9).

Figure 3:
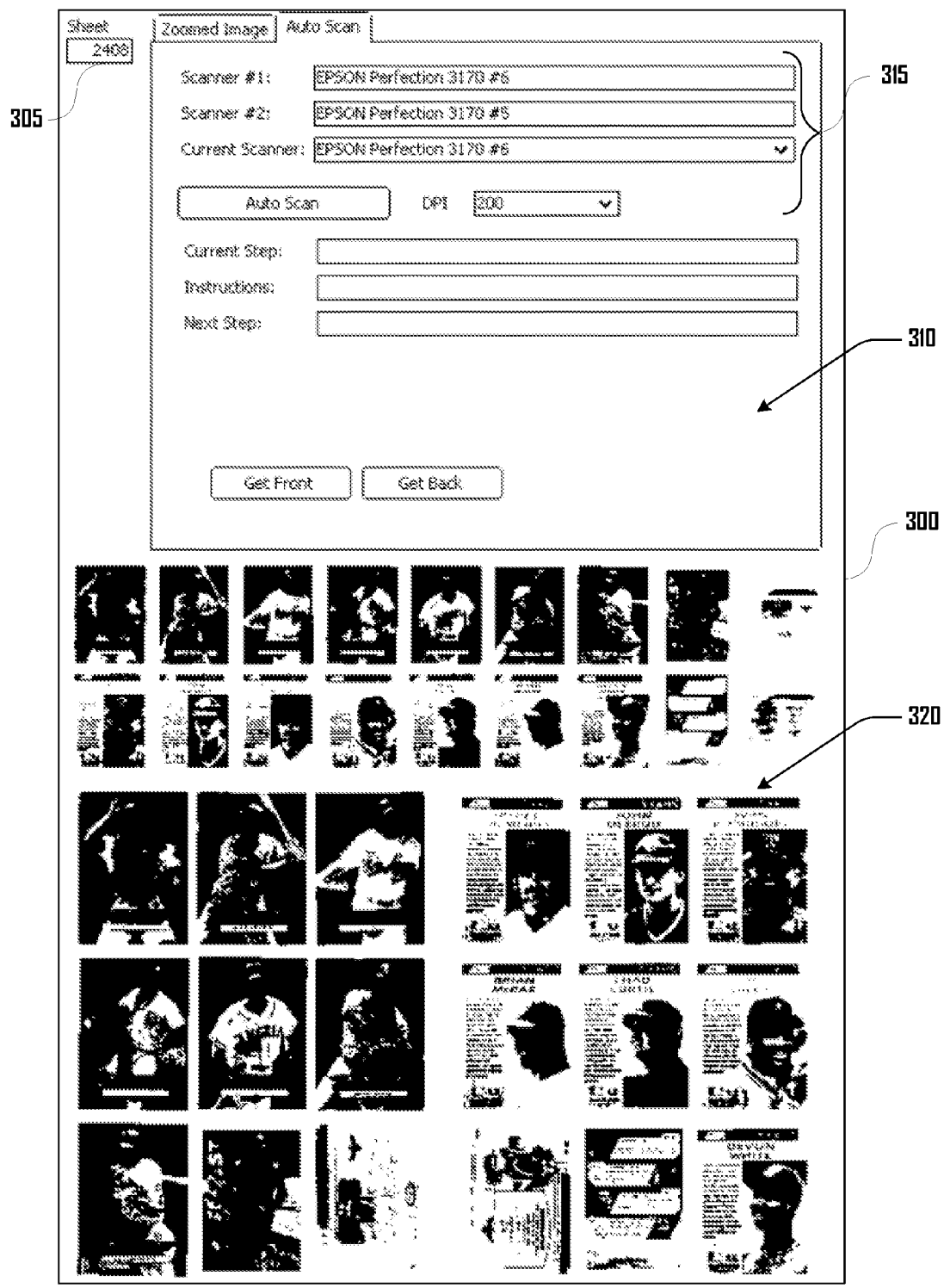
FIG. 3 is an example screenshot of an application that implements gathering images in bulk, in accordance with one embodiment.
Figure 4:
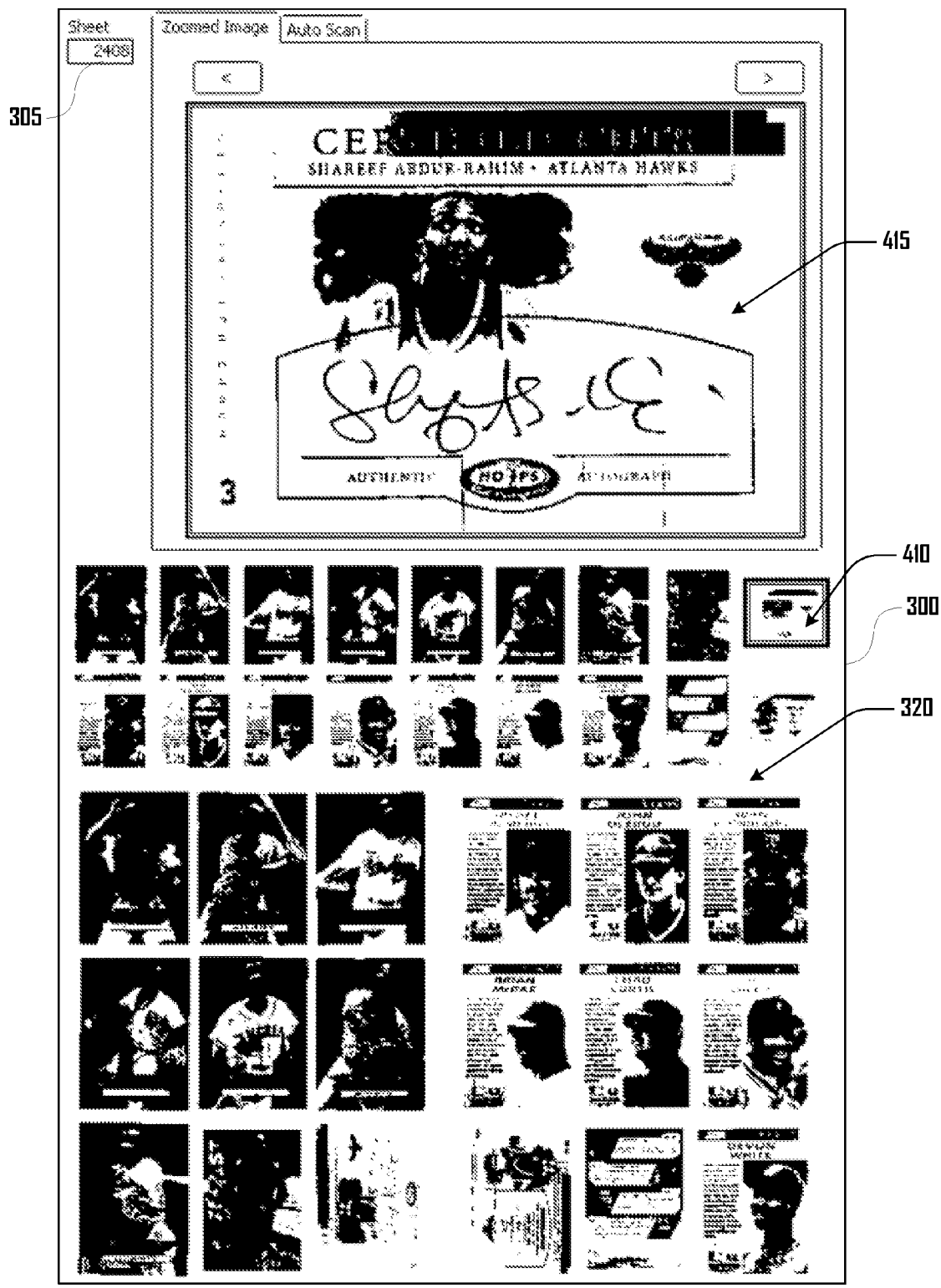
FIG. 4 is another example screenshot of an application that implements gathering images in bulk, in accordance with one embodiment.

FIGS. 3-4 illustrate example screenshots of one example implementation of a software application in accordance with one embodiment. In FIG. 3, the application 300 includes a current sheet identifier 305, indicating a current name/label for a currently displayed sheet 320. Also included is an image source information/control area 310 with image source information 305, for specifying and selecting image source(s) 145.

In FIG. 4, the application 300 also includes an expanded view 415 of a currently selected sub-image 410 from the currently displayed sheet 320.

In embodiments using two or more scanners, the application may have a mode where it will automatically start scanning from a second scanner (not shown) once it has finished scanning in the first scanner 145. This allows the user to flip the sheet in the first scanner 145 or add a new sheet to the first scanner 145 while the second scanner is gathering the image. Similarly, it will start scanning from the first scanner 145 as soon as the second scanner is done. This allows the user to simply insert sheets of items in scanners, flip the sheets, remove the sheets and insert new sheets. The result is a set of sub-images (possibly front and back associated) of each individual item named as the user chose.

Note: The manual inserting, flipping, and removing of sheets could be replaced by a sheet-fed scanner. At present, there are few automatic sheet-fed scanners on the market that do not bend the sheets. The ones that do not bend the sheets are generally more expensive than flat bed scanners that have to be manually fed. While a sheet-fed scanner may be desirable, the benefits from various embodiments also apply to manually fed scanners as well.

Once the sub-images have been saved, the system allows the user to flip through the images and attach extra data to the images, or it can automatically (or manually) attach data to a set of images.

Images may be gathered in bulk by capturing images from image sources and extracting sub-images. The sub-image extraction can happen immediately after the image is captured, or it may be done later, or even a different computing device can do it.

Image sources 145 may include digital image capturing devices such as scanners, digital cameras, video cameras, web cameras or the like. Image sources may also include existing images stored in a file system, database or the like. In these cases, the act of "capturing" may simply be loading a file. This technology can leverage one or more image sources. Increasing the number of image sources may increase the speed at which images can be gathered.

The concept of templates may be used to track information about how to perform different actions. Below is a list of example templates that will be referred to later. Under each template is a list of example information that may be used. The information may not need to include everything listed below and is not limited to what is listed below.

Sub-Image Extraction Template 165:
Size and location of the sub-image
Number of degrees to rotate the sub-image
File and folder naming convention for the sub-image
Minimum file size of the sub-image
Image Capture Template 160:
Size and location of the image to capture
Number of degrees to rotate the captured image
File and folder naming convention for the captured image Set of Sub-Image Extraction Templates 165
Image Capture Sequence Template (not shown):
  Sequence of image sources
  Sequence of Image Capture Templates 160 each with a set of Sub-Image Extraction Templates 165

Figure 5:
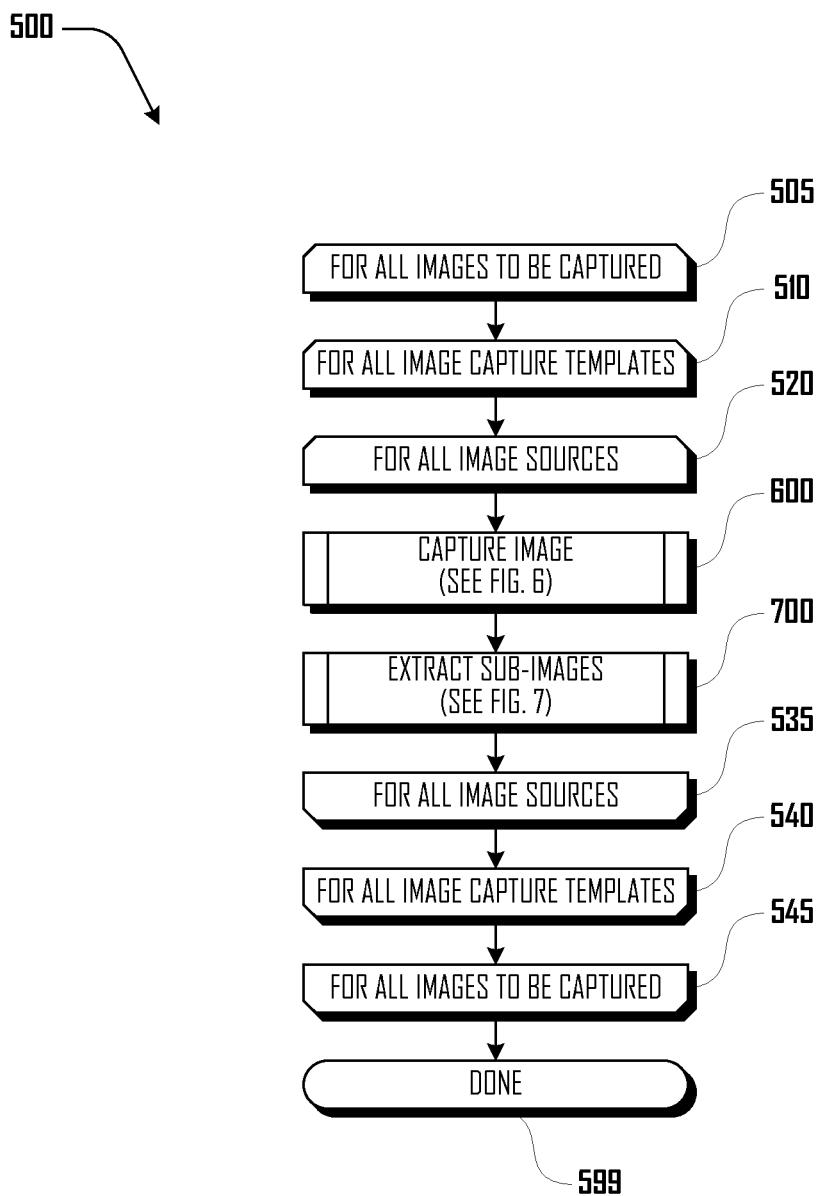
FIG. 5 illustrates a flow diagram of an exemplary routine applying an image capture sequence template, in accordance with one embodiment.

FIG. 5 illustrates a logic flow diagram for an exemplary way of executing an image capture sequence template. The process begins with looping block 505, which iterates until no more images (possibly only a single image) are available. Next, in looping block 510, an iteration begins for each image capture template (possibly only one) in a sequence of image capture templates. A set of sub-image extraction templates 165 may be included in each image capture template 160. These may be the same or they may be different for each image capture template.

In looping block 520, an iteration begins for each image source 145 in a sequence (possibly only one) of image sources. Next, in subroutine block 600, illustrated in FIG. 6 and described below, an image is captured from the image source 145. The image has sub-images extracted in subroutine block 700, illustrated in FIG. 7 and described below.

Next, in looping block 535, the image capturing routine 500 cycles back to block 520 until all image sources have been iterated through. In looping block 540, the image capturing routine 500 cycles back to block 515 until all image capture templates have been iterated through. In looping block 545, the image capturing routine 500 cycles back to block 510 until all images have been iterated through. After which, the image capturing routine 500 ends at block 599.

Note: Other looping orders may be used in alternate embodiments. For example, looping block 510 and looping block 520 (and their corresponding looping blocks 535 and 540) could be interchanged. This will cause the entire sequence of image capture templates to be applied before going to the next input device.

At some point while applying a template sequence, the user may be allowed to pause or stop the sequence. If they choose to stop while in the middle of a sequence, they may be offered the option of completing the image capture sequence(s) currently in progress without using more of the image sources in the image source sequence.

Figure 6:
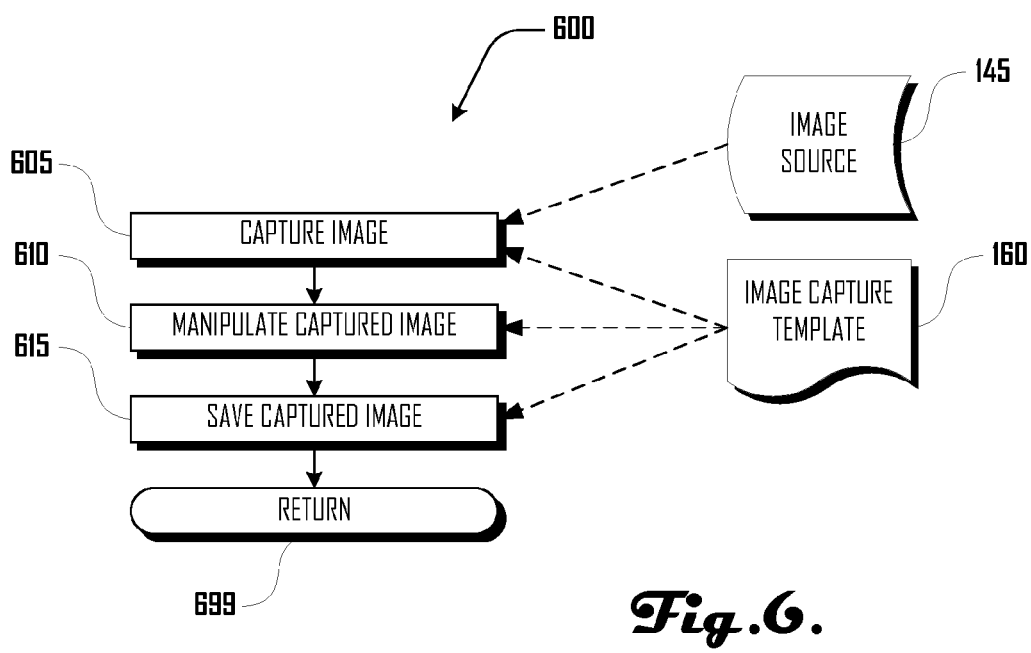
FIG. 6 illustrates a flow diagram of an exemplary subroutine for applying an image capture template to an image source, in accordance with one embodiment.

FIG. 6 illustrates a logic flow diagram for an exemplary subroutine 600 for applying an image capture template 160 to an image source 145. The process starts with operation 605 where the image source 145 is instructed to capture an image based on the information from the image capture template 160. This may include the size and location of the image. This may include the resolution or image quality to use.

Continuing to operation 610, the captured image may be manipulated based on the information in the image capture template 160. This may include the number of degrees to rotate the image. This may include a portion of the image to crop out. This may include a watermark to place on the image. This may include the software making manipulations based on analyzing the image (e.g., finding borders and cropping the image based on that).

Continuing to operation 615, the captured image and/or any of the manipulated images may be saved based on information from the image capture template 160. This may include file and folder naming conventions if the images are to be stored in a file system, or this may include other metadata information if the images are to be stored in a database 170.

Alternately, subroutine 600 may elect not to save the images and simply pass one or more of the images directly to the sub-image extraction step.

Subroutine 600 ends at block 699 and returns to its calling routine.

Figure 7:
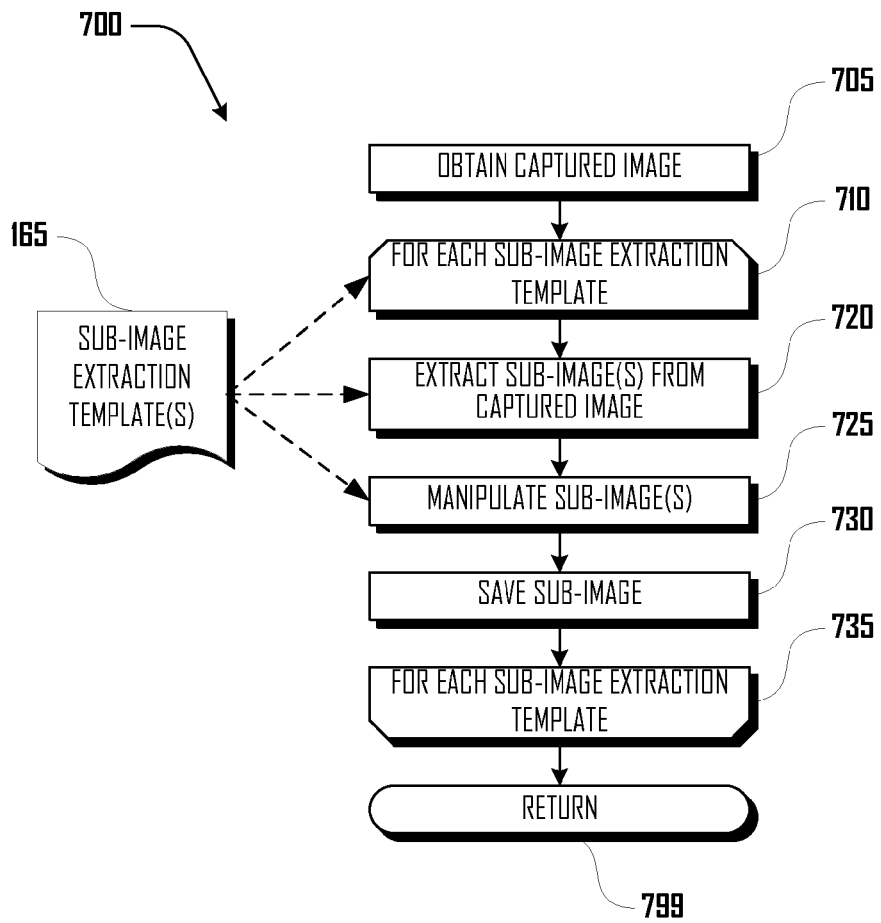
FIG. 7 illustrates a flow diagram of an exemplary subroutine for applying a set of sub-image extraction templates to an image, in accordance with one embodiment.

FIG. 7 illustrates a logic flow diagram for an exemplary subroutine 700 for applying a set of sub-image extraction templates 165 to an image. A set of sub-images may be extracted from the captured image based on the set of sub-image extraction templates defined in the current image capture template 160.

The sub-image extraction process starts with operation 705 where an image may be obtained.

Continuing to looping block 710, subroutine 700 iterates through each specified sub-image extraction template 165 in accordance with the current image capture template 160. There may be a variety of ways to iterate through a set of sub-image extraction templates 165. In this example, the set is enumerated from first to last.

Continuing to operation 720, sub-images may be extracted from the captured image based on information from the sub-image extraction template 165. This may include the size and location of the sub-image. This may deem the entire image as the "sub-image."

Continuing to operation 725, the extracted sub-image may be manipulated based on information from the current template. This may include the number of degrees to rotate the image. This may include a zoom or scale factor for creating thumbnails. In some embodiments there may be no manipulations.

Continuing to operation 730, the original sub-image(s) and/or any of the manipulated sub-image(s) may be saved based on information from the current template. This may include file and folder naming conventions if the sub-images are to be stored in a file system, or this may include other information if the sub-images are to be stored in a database 170. This may also elect not to save one or more of the sub-images. This may be because the sub-image did not satisfy a minimum file size that was specified in the template indicating that the sub-image location was blank. This may also elect not to save the image based on additional analysis on the image to determine if it should be saved.

Continuing to looping block 735, processing cycles back to looping block 710, until there are no more sub-image extraction templates in the set of sub-image extraction templates. If there is not, processing proceeds to block 799 where subroutine 700 returns to its calling routine.

In another embodiment, more than one user device 100 may be used to capture images and/or extract sub-images from the same set of objects. For example, one computer may capture the front of an object, while another computer may capture the right side of an object, while another computer may capture the left side of an object, while another computer may capture the back of an object.

In further embodiments, a computing device may be able to instruct multiple image sources to capture images simultaneously. For example, a computer may be able to instruct six digital cameras to capture images of an object all at one time. The resulting images may then be processed by that computing device or other computing devices.

In yet another embodiment, a single image source may be able to capture multiple images at one time. For example a duplex scanner may be able to scan both the front and back of a page at the same time.

In still further embodiments, a computing device may extract additional information from the images. This may include information gathered by reading barcodes, using optical character recognition, using pattern recognition or the like.

In yet further embodiments, additional information or metadata may be tagged on the images or stored with the images. This may include information from a template, information extracted from the image, information entered by the user, or the like.

In still another embodiment, the size and locations of one or more items may be automatically detected and may not need to be stored in a template. In addition, the orientation may be automatically detected allowing rotation to be done without needing to store that information in a template. Similarly, other aspects of an item may be automatically detected allowing actions to be taken without information being stored in a template.

In yet another embodiment, the sub-images may be processed to locate symbolic information (text, characters, words, names, logos, symbols, color schemes, and the like) for categorization and/or identification purposes. For example, if the words "baseball" and "Yankees" were recognized from a sub-image, the sub-image may be categorized with appropriate metadata such as:

Card type: baseball
Team name: Yankees

Of course, additional metadata may be gathered in additional embodiments.

In further embodiments, after sub-images are extracted, they may be compared with known images that already have associated metadata such that the same or similar metadata is applied to substantially identical cards (however, condition information may be applied on a card-by-card basis).

Additional embodiments may allow for the creating of inventories as sub-images are stored, such that a given merchant or object owner may keep track of how many objects (with sub-images) they possess at a given time. This may be accomplished during the sub-image extraction process or at another point when metadata is associated with an object. In some instances, metadata may be obtained before a sub-image image is obtained. For example, when a user enters the information manually ahead of time. In some embodiments, physical characteristics, including serial numbers, bar codes, 2D bar codes, text and symbols on the object or the like may be used to look up metadata associated with an object.

In still additional embodiments, the database 170 may be searched for information about sub-images and their associated objects. For example, if a scanned image is of a sheet of held objects that are coins, it would be possible to query the database for information related to the previously captured sub-images of the coins. Some queries may relate to the metadata associated with the sub-images, while other queries may be invoked from a subsequent image capture of a previously capture object. In such an example, a user may submit an image of a coin and generate a query asking if any of the sub-images in the database 170 are similar.

Accordingly, in one example implementation, the inventory may be used to associate similar objects, and to located appropriate holders for placing an object that may be a duplicate, in a set with, or otherwise associated with, already placed objects.

In some embodiments, a system may have previously captured a large inventory of item images. For example, in one embodiment, a system may have an "inventory" of images of collectible cards, each associated with metadata related to the card. When the system captures new images of new items, it may need to associate metadata with the new item-images so that the new item-images may be, for example, searchable according to various metadata parameters. In many cases, a new item may be identical or similar to a previously captured item, such that some or all of the previously captured item's metadata may be relevantly associated with the new item. In other embodiments, similar techniques may be applied to matching images of items other than collectible cards. For example, in various embodiments, the selectively-variant image matching processes discussed below could be applied to determine indices for scans of photographs, which might always be captured in portrait orientation, but landscape-orientation photographs may be scanned in either of two rotations. In other embodiments, an image of a three-dimensional object (e.g., a collectible matchbox car) along a particular axis may be captured with the object oriented one way or another. In such cases, symmetrically equivalent sub-images may be grouped together, as discussed below, to provide a selectably invariant image index when items could be digitally captured in more than one orientation.

Figure 8:
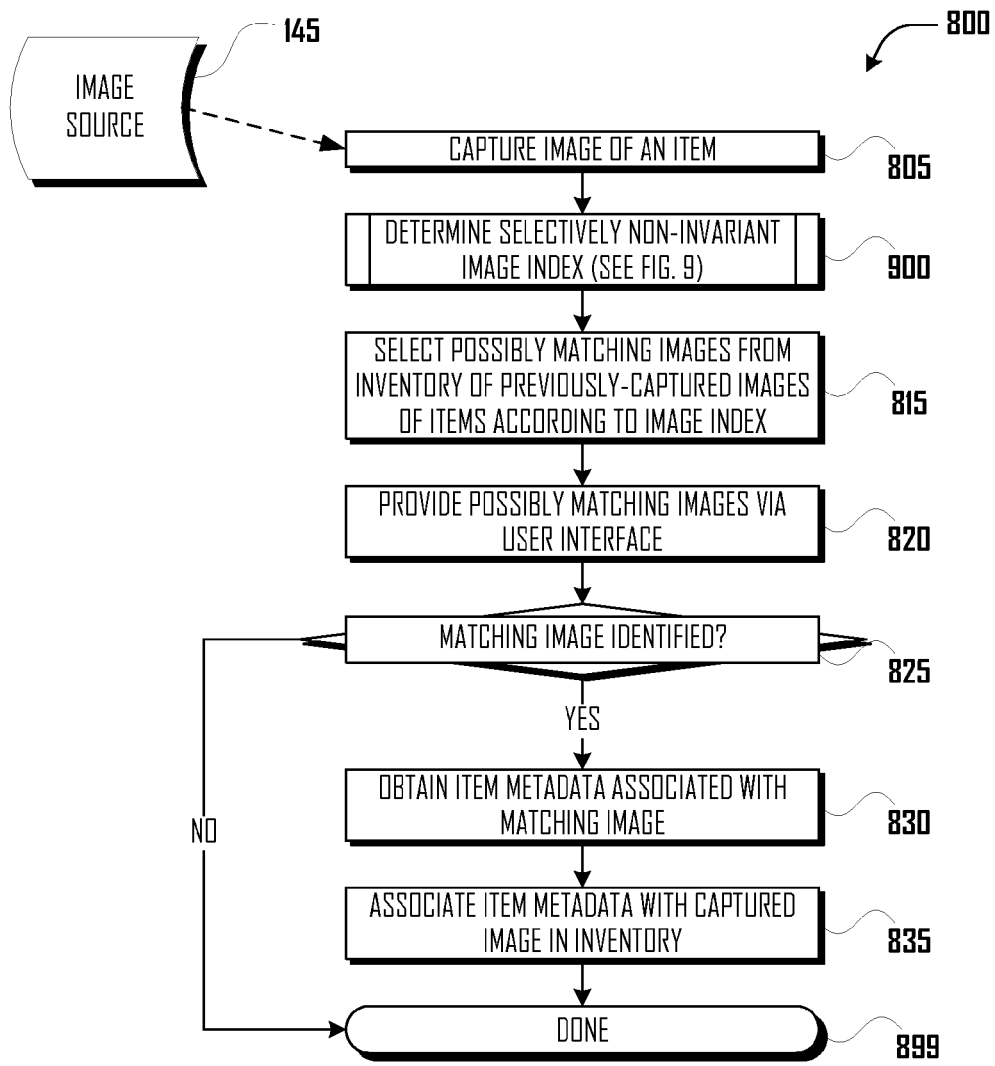
FIG. 8 illustrates a flow diagram of an exemplary routine for image matching, in accordance with one embodiment.

FIG. 8 illustrates a flow diagram of an exemplary routine 800 for at least partially automating the process of matching a newly captured image against an inventory of previously captured images so that at least some metadata from a matching image may be associated with the newly-captured image, in accordance with one embodiment. In some embodiments, routine 800 may be iteratively performed as a batch process after a quantity of new item images have been captured.

In block 805, image source 145 is instructed to capture an image of an item. In subroutine block 900 (see FIG. 9, discussed below), routine 800 determines an image index that is selectively variant (non-invariant) to certain geometric transformations of the image. In some embodiments, several captured item images may be processed in a batch. In such cases, the captured item images may be sorted according to image index and processed in a sequence such that similar images are processed near each other in the sequence. Such an approach may speed up manual portions of the process (discussed below), as similar images often have similar metadata.

In block 815, routine 800 selects a plurality of possibly matching images from an inventory of previously captured images of items stored in a data store such as database 170. For example, in one embodiment, routine 800 may select dozens or scores of previously captured images that have indices similar to the image index determined in subroutine block 900. In some embodiments, the image index may include a representation of several color histograms associated with the captured image, and selecting possibly matching images may include matching histograms, determining histogram intersections, determining histogram distances, and/or otherwise determining histogram similarities between the color histograms associated with the captured image and color histograms associated with previously-captured images in the inventory of previously-captured images of items. For example, in one embodiment, the intersection of two color histograms may be quantified as a percentage of overlap. These percentages can for each corresponding histogram in the two image indexes being compared. This generates another percentage that represents how similar the two images are. The higher the percentage the more similar the images are.

The term "color histogram" is used herein to refer to a representation of the distribution of colors in an image. For digital images, a color histogram represents the number of pixels that have colors in each of a fixed list of color ranges or bins that span the image's color space. In various embodiments, this "number of pixels" may be represented by various values, such as an absolute count of pixels that have colors in each bin, a quantized count of pixels that have colors in each bin, a percentage of pixels that have colors in each bin, and the like. In alternate embodiments, an intensity histogram may be similarly employed when monochromatic images are to be processed.

Having identified a number of possibly matching images for the newly-captured image, routine 800 provides in block 820 a user interface by which an operator may view the possible matches and identify a matching image (if any). In some embodiments, image indices may further be used to sort images according to similarity, and the possible matches may be displayed in such order.

In decision block 825, routine 800 determines whether a matching image was identified via the user interface provided in block 820. If so, then in block 830, routine 800 obtains item metadata associated with the matching image, and in block 835, routine 800 associates some or all of the metadata with the newly captured image and adds the newly captured image to the inventory. In some embodiments, the user interface may further provide a facility for the operator to indicate whether the matching image is an exact or partial match. For example, in some cases the item from which the image was captured will similar to a previously captured item, such as different baseball cards from the same series or different baseball cards for the same player. In such cases, the user interface may provide a facility for the operator to indicate which portion of metadata from the previously captured card should be associated with the newly captured card.

Routine 800 ends in block 899.

Figure 9:
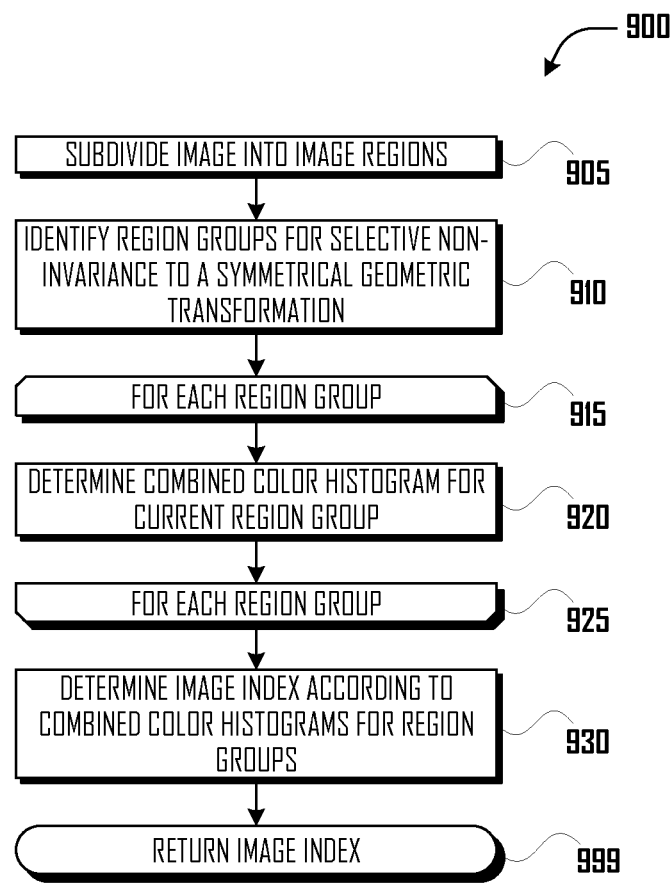
FIG. 9 illustrates a flow diagram of an exemplary subroutine for determining an image index, in accordance with one embodiment.

FIG. 9 illustrates a flow diagram of an exemplary subroutine 900 for determining an image index via color histograms, in accordance with one embodiment. As the term is used herein, an image "index" refers to an identifier that may be used to identify identical or similar images based on their contents. More specifically, the image indices described herein are derived from color histograms of the images. Relevant background material related to color histogram-based image indexing may be found in the following paper, which is hereby incorporated by reference in its entirety, for all purposes: Du-Sik Park, Jong-Seung Park, Tae-Yong Kim, Joon Hee Han, "Image Indexing Using Weighted Color Histogram," iciap, pp. 909, 10th International Conference on Image Analysis and Processing (ICIAP'99), 1999.

Color histogram-based image indices are generally considered to be robust with respect to geometric changes of projected objects. Color histograms are generally considered to be invariant to translation and rotation around the viewing axis and to vary slowly with changes of view angle, scale, and occlusion. Moreover, color histograms using a weighted perceptually uniform color space (e.g., CIE 1976 (L*, u*, v*) color space or "CIELUV") may be similarly robust to variations in color values of a printed item. For example, images of otherwise identical collectible cards may nonetheless have varying color values due to variations in the ink used to print the card, variations in the age and condition of the card, variations in the capture device used to capture the image, and the like.

Figure 10:
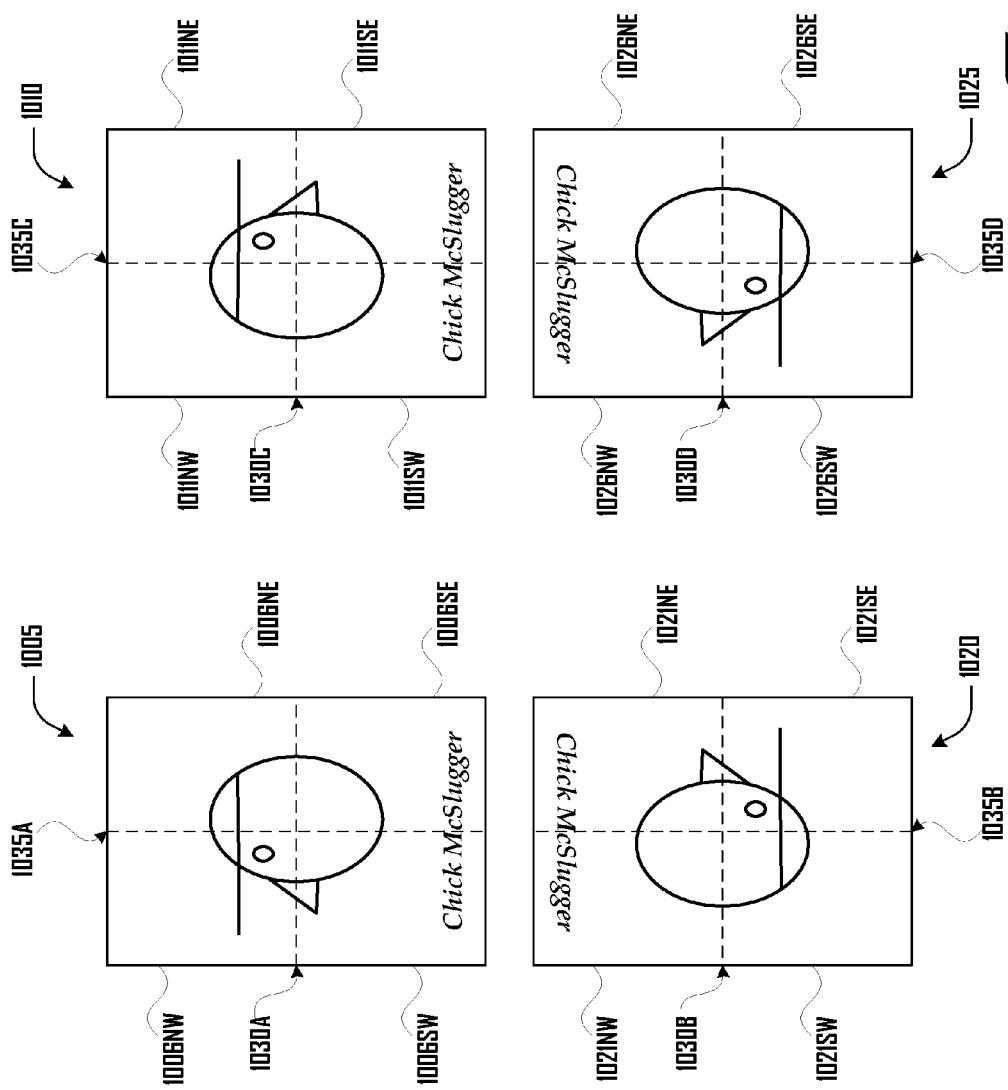
FIG. 10 illustrates an exemplary set of simplified captured item images, in accordance with one embodiment.

In some embodiments, an image-indexing process may be designed to be robust to such color variations. Furthermore, in some embodiments, an image-indexing process may be designed to be invariant to certain geometric transformations of an item image. For example, as illustrated in FIG. 10, item images 1005 and 1020 depict items (here, collectible cards) that are identical. However, item image 1005 captures an image of the card in one rotation, whereas item image 1020 captures an image of a card rotated 180-degrees about a center point (the intersection of horizontal axis of symmetry 1030B and vertical axis of symmetry 1035B). Such a 180-degree (symmetrical) rotation in the captured image may arise when an item can be placed in a holder object in either of two symmetrical orientations (e.g., upside-side up or upside-down). In one embodiment, an image indexing process may be invariant to a symmetrical geometric transformation such as 180-degree rotation about a center point, such that an index derived for item image 1005 should match an index derived for item image 1020, as images 1005 and 1020 depict items that should be regarded as identical. Generally speaking, color-histogram-based image indices are generally considered to be invariant to such symmetrical geometric transformations.

However, in some cases, an image index may be designed to be variant to certain other symmetrical geometric transformations. For example, item image 1010 depicts a collectible card that was printed with a reflection geometric transformation about vertical axis of symmetry 1035C. In some embodiments, such reflection transformations may indicate that the collectible card from which image 1010 was captured was a printing error. In many cases, collectible items that exhibit such printing errors may be much more valuable than similar items that were printed properly. Consequently, an image index may be designed to be variant to reflection geometric transformations about at least one axis of symmetry, such that such that an index derived for item image 1005 should be distinguishable from an index derived for item image 1010, as images 1005 and 1010 depict items that should be regarded as distinct. (However, item image 1025 should match item 1010, as item image 1025 represents merely a 180-degree rotation of item image 1010, such as may arise due to variations in two otherwise identical cards being placed in a holder object in two different orientations.)

Thus, previously-known color-histogram-based image indexing processes are unsuitable for deriving image indices that may distinguish between item images 1005 and 1010, while still treating item images 1005 and 1020 as matching (and similarly treating item images 1010 and 1025 as matching).

Referring again to FIG. 9, subroutine 900 illustrates a method for generating an image index for a given item image that is able to distinguish between item images 1005 and 1010, while still treating item images 1005 and 1020 as matching. Beginning in block 905, subroutine 900 subdivides the given item image into at least four image regions. For example, as illustrated in FIG. 10, in one embodiment, subroutine 900 may subdivide the item image into quadrants, such as quadrants 1006NW, 1006NE, 1006SE, and 1006SW; quadrants 1021NW, 1021NE, 1021SE, and 1021SW; quadrants 1011NW, 1011NE, 1011SE, and 1011SW; or quadrants 1026NW, 1026NE, 1026SE, and 1026SW.

Figure 11:
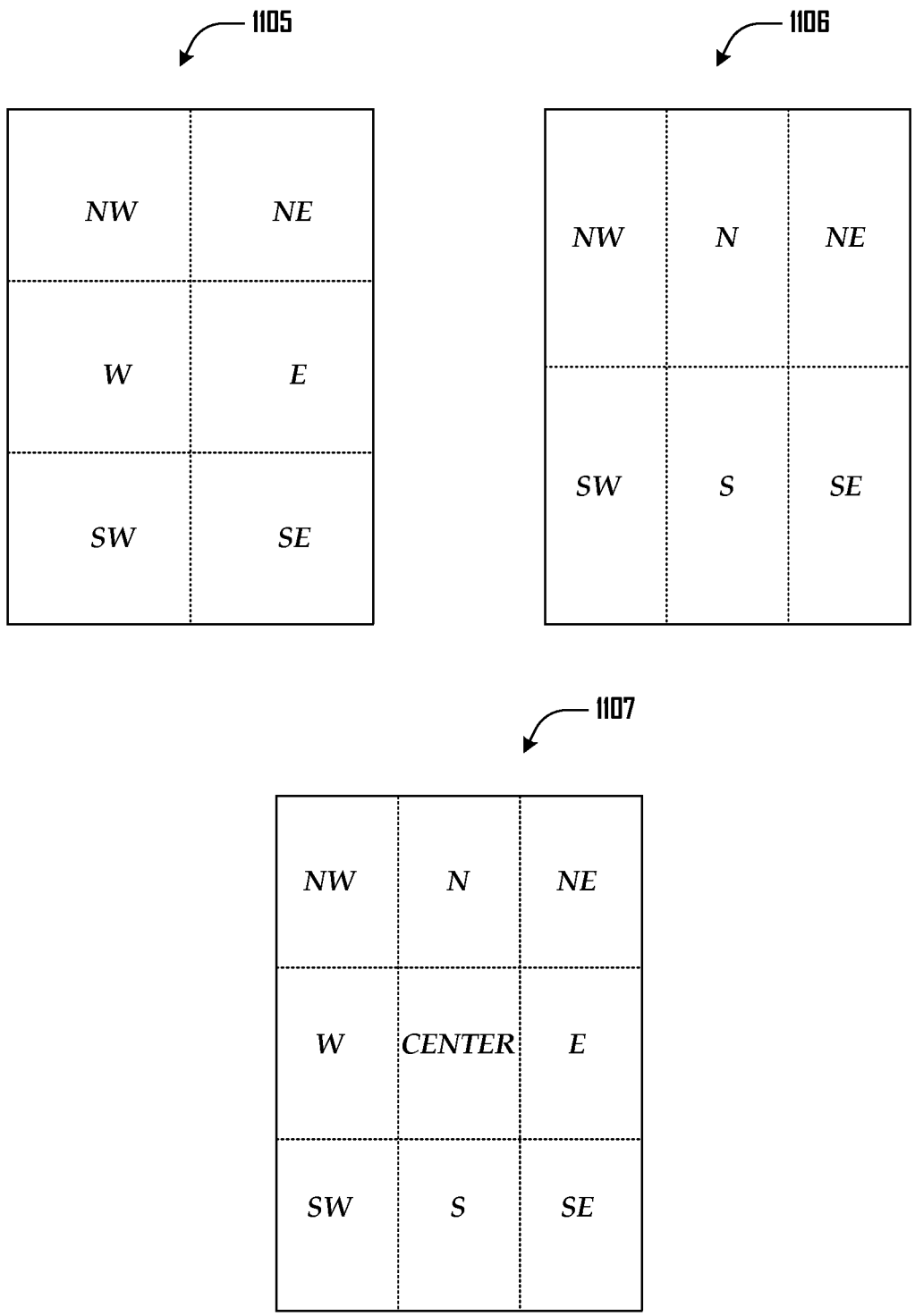
FIG. 11 illustrates an exemplary set of image region configurations, in accordance with one embodiment.

In other embodiments, as illustrated in FIG. 11, subroutine 900 may subdivide the item image into a 2×3 grid 1105, a 3×2 grid 1106, or a 3×3 grid 1107 (resulting in regions that may, for illustrative purposes, be conveniently referred to as cardinal and/or intercardinal compass directions). In still other embodiments, subroutine 900 may subdivide the image into other configurations (not shown) of tessellated, congruent, rectangular regions, such as a 4×4 grid, a 5×5 grid, a 4×5 grid, and the like. In alternate embodiments, regions may be non-tessellated, non-congruent, and/or non-rectangular. For example, in one embodiment, subroutine 900 may subdivide the image into regions that omit one or more portions of the image (e.g., the image may include dark spots or other anomalies that should be ignored when generating an image index). In another embodiment, subroutine 900 may subdivide the image into regions that overlap, in which case, the overlapping portions of the image might be selected to weigh more heavily when matching similar images.

Referring again to FIG. 9, having subdivided the item image into at least four regions, in block 910, subroutine 900 identifies two or more region groups, each including a symmetric pair of the image regions such that a combined color distribution of the symmetric pair of image regions is invariant to the first symmetrical geometric transformation (e.g., 180-degree rotation about a center point), but variant to a second symmetrical geometric transformation (e.g., reflection about an axis of symmetry).

For example, as illustrated in FIG. 10, it may be observed that the combined color distributions of NW and SE regions (e.g., 1006NW and 1006SE, 1021NW and 1021SE, 1011NW and 1011SE, and 1026NW and 1026SE) remain constant regardless of a 180-degree rotation of the image about a center point. Put another way, it may be observed that while the color distribution of region 1006NW differs from that of region 1021NW, the combined color distribution of regions 1006NW and 1006SE is the same as the combined color distribution of regions 1021NW and 1021SE.

Thus, the combined color distributions of NW and SE regions are invariant to 180-degree rotations of the image about a center point. Similarly, the combined color distributions of NE and SW regions are invariant to 180-degree rotations of the image about a center point. Regions 1006NW and 1006SE therefore make up one "symmetric pair" of image regions with respect to a 180-degree rotation about a center point, and regions 1021NW and 1021SE make up a second symmetric pair of image regions with respect to the same 180-degree rotation.

At the same time, the combined color distributions of NW and SE regions are variant to reflections of the image about vertical axes of symmetry. Similarly, the combined color distributions of NE and SW regions are variant to reflections of the image about vertical axes of symmetry. In other words, it may be observed that the combined color distribution of regions 1006NW and 1006SE differs from the combined color distribution of regions 1011NW and 1011SE.

Hence, when identifying region groups among quadrant regions to be invariant to 180-degree rotations about a center point and variant to reflections about a vertical axis of symmetry, subroutine 900 would identify one group including NW and SE regions, and a second group including NE and SW regions. Similarly, when identifying region groups among regions in a 2×3 grid (e.g., grid 1105) to be invariant to such 180-degree rotations and variant to such reflections, subroutine 900 would identify one group including NW and SE regions, a second group including NE and SW regions, and a third group including W and E regions. In a 3×2 grid (e.g., grid 1106), subroutine 900 would identify one group including NW and SE regions, a second group including NE and SW regions, and a third group including N and S regions. In a 3×3 grid (e.g., grid 1107), subroutine 900 would identify one group including NW and SE regions, a second group including NE and SW regions, a third group including N and S regions, and a fourth group including W and E regions. In a 3×3 grid, the center region may also be considered when creating an index, although it is not a part of a region group.

In other embodiments, subroutine 900 may identify groups with different invariant/variant geometric transformations. For example, when identifying region groups among quadrant regions to be invariant to reflections about a vertical axis of symmetry and variant to 180-degree rotations about a center point, subroutine 900 would identify one group including NW and NE regions, and a second group including SE and SW regions. For another example, region groups might be identified between an first image of one side of a card (or other multi-sided item) and a second image of the other side of the card, such that combined color distributions would be invariant to whether the first image was of the front or of the back of the card. In other words, when identifying region groups among quadrant regions of two images of two sides of an item, the groups being identified to be invariant to rotations about a vertical axis of symmetry, subroutine 900 would identify one group including the NW regions of the two images, a second group including the NE regions of the two images, a third group including the SE regions of the two images, and a fourth group including the SW regions of the two images.

Moreover, the methods described herein are illustrated and explained with respect to non-square rectangular images that are symmetrical to 180-degree rotations about a center point and thus require at least two (180/360) region groups of at least two regions each, or a minimum of four regions. However, in other embodiments, similar techniques may be applied to images that are symmetrical to different and/or additional geometric transformations. For example, square images may be symmetrical to 90-degree rotations about a center point. To apply the methods described herein for selective invariance to 90-degree symmetrical rotations requires at least four (90/360) region groups of at least two regions each, or a minimum of eight regions.

Beginning in opening loop block 915, subroutine 900 processes each region group identified in block 910. In block 920, subroutine 900 determines a combined color histogram for the current region group. For example, in one embodiment, subroutine 900 may determine a color histogram for each individual region of the current region group, and then combine the individual color histograms into a combined histogram. In other embodiments, subroutine 900 may combine each individual region of the current region group into a combined image, and then determine a color histogram for the combined image.

In some embodiments, the combined color histogram may be determined with respect to a perceptually uniform color space, such as CIELUV. In some embodiments, the combined color histogram may be determined with respect to a weighting scheme according to which one or more bins in a color space may be weighted according to a factor such as a volume of color space included within the bin. In some embodiments, subroutine 900 may further include converting the item image (not shown) from one color space (e.g., RGB) to a perceptually uniform color space (e.g., CIELUV).

In ending loop block 925, subroutine 900 iterates back to block 915 to process the next region group (if any). Once all region groups have been processed, in block 930, subroutine 900 determines an image index according to the combined color histograms determined for each region group. For example, in some embodiments, determining the image index may include converting "raw" combined color histograms into a form suitable for efficient storage and comparison. In one embodiment, an image index may comprise two or more combined color histograms, each being represented by a series of bin-identifier, quantized-pixel-count pairs, where the quantized-pixel-count for each bin is expressed in one byte.

Subroutine 900 ends in block 999, returning the determined image index to the caller.

Although specific embodiments have been illustrated and described herein, it will be appreciated by those of ordinary skill in the art that a wide variety of alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for image matching, the method comprising:
   capturing, by the computer, a digital image of an item;
   determining, by the computer, an image index for the digital image, the image index being invariant to a first symmetrical geometric transformation, but variant to a second symmetrical geometric transformation, by the computer performing at least steps (i)-(iv):
   (i) subdividing the digital image into at least four image regions;
   (ii) identifying a plurality of region groups, each including a symmetric pair of the image regions such that a combined color distribution of the symmetric pair of image regions is invariant to the first symmetrical geometric transformation, but variant to the second symmetrical geometric transformation;
   (iii) determining a plurality of combined color histograms corresponding respectively to the plurality of region groups; and
   (iv) determining the image index according to at least the plurality of combined color histograms; and
   selecting, by the computer, from an inventory of previously captured item images, a plurality of previously captured item images having image indices similar to the determined image index, the selected plurality of previously captured item images being possible matches for the digital image without respect to the first symmetrical geometric transformation, but with respect to the second symmetrical geometric transformation.

2. The method of claim 1, wherein the first symmetrical geometric transformation is selected from a transformation group consisting of a 180-degree rotation transformation about a center point of the digital image and a reflection transformation about an axis of symmetry of the digital image; and wherein the second symmetrical geometric transformation is the unselected transformation of the transformation group.

3. The method of claim 1, wherein the at least four image regions are tessellated, congruent, rectangular regions.

4. The method of claim 3, wherein the first symmetrical geometric transformation is a 180-degree rotation transformation about a center point of the digital image, and wherein the second symmetrical geometric transformation is a reflection transformation about an axis of symmetry of the digital image.

5. The method of claim 4, wherein the at least four image regions are arranged in a two-by-two grid consisting of a northwest quadrant, a northeast quadrant, a southwest quadrant, and a southeast quadrant; and wherein a first region group of the plurality of region groups consists of the northwest quadrant and the southeast quadrant, and a second region group of the plurality of region groups consists of the northeast quadrant and the southwest quadrant.

6. The method of claim 4, wherein the at least four image regions are arranged in a three-by-three grid comprising a northwest region, a north region, a northeast region, a west region, an east region, a southwest region, a south region, and a southeast region; and wherein:
   a first region group of the plurality of region groups consists of the northwest region and the southeast region;
   a second region group of the plurality of region groups consists of the northeast region and the southwest region;
   a third region group of the plurality of region groups consists of the north region and the south region; and
   a fourth region group of the plurality of region groups consists of the east region and the west region.

7. The method of claim 6, wherein the image index is determined further according to a color histogram of a center region.

8. The method of claim 1, wherein the plurality of combined color histograms is determined in a perceptually uniform color space.

9. The method of claim 8, wherein the perceptually uniform color space is the CIE 1976 ($L^*$, $u^*$, $v^*$) color space ("CIELUV").

10. The method of claim 8, further comprising converting the digital image into the perceptually uniform color space.

11. The method of claim 1, wherein obtaining the digital image of the item comprises digitally capturing an image of the item, the item being held in a holder object to facilitate capturing item images in bulk, the holder object being configured to position the item in either a first orientation or a second orientation, the second orientation being rotated 180-degrees from the first orientation.

12. The method of claim 11, wherein the image index is invariant to the positioned orientation of the item in the holder object.

13. The method of claim 1, further comprising:
   providing a user interface enabling a user to identify a matching one of the selected plurality of previously captured item images;
   receiving, via the user interface, an indication identifying the matching one of the selected plurality of previously captured item images;
   obtaining item metadata associated with the matching one of the selected plurality of previously captured item images; and
   associating the item metadata with the digital image of the item in the inventory of previously captured item images.

14. A non-transitory computer-readable medium having tangibly stored thereon instructions that, when executed by a processor, perform the method of claim 1.

15. A computing apparatus comprising a processor and a memory having stored thereon instructions that, when executed by the processor, perform the method of claim 1.

* * * * *